(12) United States Patent
Marino et al.

(10) Patent No.: US 10,680,846 B2
(45) Date of Patent: Jun. 9, 2020

(54) METHOD AND APPARATUS FOR IMPLEMENTING HDMI CEC

(71) Applicant: Caavo Inc, Santa Clara, CA (US)

(72) Inventors: Nino V. Marino, Alameda, CA (US);
Pankaj Kashyap, Pune (IN); Shankara R. Sundararajan, Bangalore (IN);
Vinod K. Gopinath, Bangalore (IN);
Sharath H. Satheesh, Bangalore (IN);
Ashish D. Aggarwal, Stevenson Ranch, CA (US); Bitto Niclavose, Kottayam (IN); Conrad Savio Jude Gomes, Salcete (IN)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 15/475,919

(22) Filed: Mar. 31, 2017

(65) Prior Publication Data
US 2017/0288895 A1    Oct. 5, 2017

Related U.S. Application Data

(60) Provisional application No. 62/317,401, filed on Apr. 1, 2016.

(51) Int. Cl.
*H04L 12/28* (2006.01)
*H04N 21/4363* (2011.01)
(Continued)

(52) U.S. Cl.
CPC ........ *H04L 12/283* (2013.01); *G06F 13/4022* (2013.01); *G09G 5/006* (2013.01);
(Continued)

(58) Field of Classification Search
CPC ............... H04L 12/283; H04L 12/2832; H04L 2012/2849; G06F 13/4022; G09G 5/006;
(Continued)

(56) References Cited

U.S. PATENT DOCUMENTS

| 8,260,975 B1 * | 9/2012 | Schanin ................ G09G 5/006 |
| | | 710/15 |
| 8,294,821 B1 | 10/2012 | Overby et al. |

(Continued)

FOREIGN PATENT DOCUMENTS

| EP | 2608563 A1 | 6/2013 |
| EP | 2611077 A1 | 7/2013 |
| WO | 2007/101236 A1 | 9/2007 |
| WO | 2017/173377 A1 | 10/2017 |

OTHER PUBLICATIONS

International Search Report and Written Opinion received for PCT Patent Application No. PCT/US2017/025564, dated Jun. 14, 2017, 13 pages.
International Preliminary Report on Patentability and Written Opinion Received for PCT Patent Application No. PCT/US2017/025564, dated Oct. 11, 2018, 7 pages.

*Primary Examiner* — Christopher M Crutchfield
*Assistant Examiner* — Tito Q Pham
(74) *Attorney, Agent, or Firm* — Fiala & Weaver P.L.L.C.

(57) ABSTRACT

Methods, systems and apparatuses are described to detect and resolve device configuration and/or communication incompatibilities (e.g. incompatible messages, improper addressing, malfunctions) for a communication protocol such as HDMI-CEC.

20 Claims, 7 Drawing Sheets

(51) Int. Cl.
*G09G 5/00* (2006.01)
*G06F 13/40* (2006.01)

(52) U.S. Cl.
CPC ...... *H04L 12/2805* (2013.01); *H04L 12/2832* (2013.01); *H04N 21/43635* (2013.01); *G09G 2330/08* (2013.01); *G09G 2370/06* (2013.01); *G09G 2370/12* (2013.01); *G09G 2370/20* (2013.01); *H04L 2012/2849* (2013.01)

(58) Field of Classification Search
CPC ........... G09G 2330/08; G09G 2370/06; G09G 2370/12; G09G 2370/20; H94L 12/2805; H04N 21/43635
See application file for complete search history.

(56) References Cited

U.S. PATENT DOCUMENTS

| | | | | |
|---|---|---|---|---|
| 8,708,750 | B2* | 4/2014 | Ho | H01R 27/02 439/639 |
| 2009/0296731 | A1* | 12/2009 | Lida | G06F 3/1454 370/449 |
| 2014/0162727 | A1* | 6/2014 | Saito | H04N 7/108 455/559 |

* cited by examiner

METHOD AND APPARATUS FOR IMPLEMENTING HDMI CEC

CROSS REFERENCE TO RELATED APPLICATIONS

This application claims priority to U.S. Provisional Patent Application No. 62/317,401, filed on Apr. 1, 2016, and entitled "METHOD AND APPARATUS FOR IMPLEMENTING HDMI CEC," the entirety of which is incorporated by reference as if fully set forth herein.

BACKGROUND

Technical Field

The subject matter described herein relates, in part, to high-definition multimedia interface (HDMI) connectivity.

Description of Related Art

HDMI Consumer Electronics Control (HDMI-CEC) is implemented in the vast majority of TVs, audio-video receivers, DVD/Blu-Ray players and a growing number of streaming devices. HDMI-CEC is described in an HDMI specification. HDMI-CEC may be used for device identification, power state monitoring, automatic input switching based on a currently active source and universal control of HDMI connected devices.

BRIEF SUMMARY

Methods, systems and apparatuses are described to detect and resolve device configuration and/or communication incompatibilities (e.g. incompatible messages, improper addressing, malfunctions) for a communication protocol such as HDMI-CEC, substantially as shown in and/or described herein, including in the claims and drawings.

BRIEF DESCRIPTION OF THE DRAWINGS/FIGURES

The drawings, summary, detailed description and claims individually and collectively present non-limiting examples. The accompanying drawings, which are incorporated herein and form a part of the specification, illustrate embodiments and, together with the description, further serve to explain the principles of the embodiments and to enable a person skilled in the pertinent art to make and use these and other embodiments.

Figure 1:
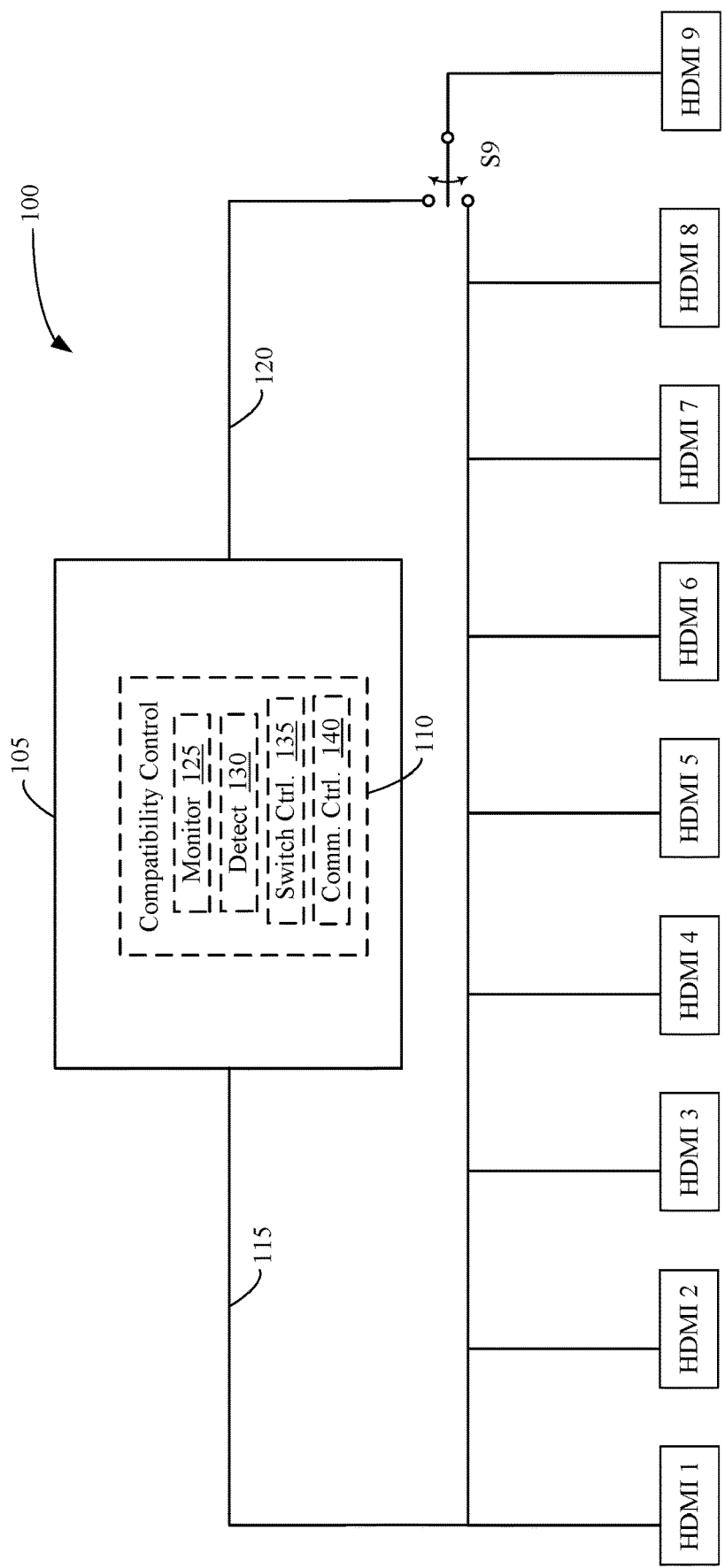
FIG. 1 is an example of a communication system with compatibility control and a reconfigurable communication path for a plurality of devices.

Embodiments will now be described with reference to the accompanying drawings.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

The term embodiment is defined as a non-limiting example among many possible examples in the spirit and scope of this disclosure. An example may be a described and/or implemented example. An example (e.g. embodiment) herein may indicate a particular feature, structure, characteristic, procedure, etc. Other examples may be implemented with none, one or more (e.g. all) of the features, structures, characteristics, procedures, etc. that may be utilized in one or more other examples with or without the same configuration in other examples (e.g. implementations). This disclosure is written in view of one of ordinary skill in the art with knowledge and skill to implement features, structures, characteristics, procedures, etc. in disclosed examples as well as in other examples not disclosed herein. Although examples may be described relative to HDMI-CEC, they and/or other examples may be implemented for other communication protocols.

A source device is defined as a device that sends a signal (e.g. an AV signal) to a sink device. Examples of HDMI source devices include an HDMI DVD player and an HDMI set-top box.

A sink device is defined as a device that receives a signal (e.g. an AV signal) from a source device. An example of an HDMI sink device is an HDMI TV (HDTV).

A repeater (e.g. transceiver) is defined as a device that sends (e.g. sources) and receives (e.g. sinks) signals. Examples of an HDMI repeater include an HDMI A/V receiver or HDMI switch.

HDMI-CEC is a communication channel (e.g. serial bus with an associated communication protocol) that may be present in an HDMI cable. HDMI-CEC may be implemented, for example, as a single-wire interface. HDMI devices may be coupled to (e.g. connected to or hung on) a CEC interface, creating a chain of HDMI devices. A CEC channel (e.g. path or line) may carry messages defined by an HDMI-CEC specification, which may enable HDMI devices to communicate with each other. A CEC line may permit command and control of CEC-enabled devices (e.g. AV receiver, TV, set-top box, smart HDMI cable circuitry) connected through HDMI, for example, by one or more remote controls and/or by one or more CEC-enabled devices. In an example, an active source command may be sent by a source device (e.g. with its Physical Address (PA) as a parameter) so that one or more devices in the chain (e.g. HDMI Switch, TV, etc.) switch to the right HDMI ports, for example, to provide audio-video (AV) content from the active source device to the sink device (e.g. TV). In another example of a command, a remote control pass-through command may comprise, for example, "play." A pass-through command may be provided, for example, by a sink device (e.g. TV) with a Logical Address (LA) of a destination device as parameter so that the destination device with the LA may perform that command (e.g. requested operation).

The HDMI-CEC specification is vaguely written. There are incompatible implementations of HDMI-CEC across vendors and devices. Devices in an HDMI chain may be exposed to every CEC message from every device in the chain, including incompatible devices. A malfunctioning or incompatible device may cause all devices in an HDMI chain to operate in an unintended manner. In addition, the CEC specification limits the number of devices by type in an HDMI chain. However, an end-user (e.g. consumer) may be unaware of device types or when limits are reached, which may lead to frustrated end-users without a reliable way to determine which configurations work and which devices will be available for control. The result of these compounded issues is that HDMI-CEC may be unusable by many end-users and HDMI devices may be returned as defective or incompatible.

Logic (e.g. circuit, processor, μC, system on a chip) may tap a CEC line in an HDMI cable. A CEC line tap may permit logic to communicate with (e.g. intercept and modify communications between) source and/or sink devices coupled to the HDMI cable.

II. Example Embodiments

Device incompatibilities may be detected and resolved, for example, by "proxy" communication. A compatibility (e.g. interoperability) device or module (e.g. with proxy communication) may monitor (e.g. intercept), interpret, pass, filter, modify and/or block communication messages between various devices in a CEC chain of source and sink devices.

A communication path (e.g. CEC channel) may be selectively modified, for example, to resolve incompatibilities. Source and sink devices may be selectively coupled to and decoupled from a (e.g. variable) communication path. In an example, source and sink devices may be coupled to or configured to be selectively coupled to a communication path (e.g. a single wire) in accordance with a specification (e.g. HDMI specification), which may be a default configuration or communication path. A (e.g. default) communication path may be selectively modified (e.g. to resolve incompatibility), for example, by selectively coupling and/or decoupling one or more sink or source devices or compatibility device for one or more (e.g. alternative) communication paths. Coupling and/or decoupling may be temporary or permanent, for example, depending on circumstances leading to coupling and/or decoupling. In an example, an alternative path (e.g. a modified communication path) may prevent one or more (e.g. all) source and sink devices from receiving every message communicated by one or more source or sink devices, which may promote compatibility of otherwise incompatible configurations or devices. In an example, individual source devices, groups or clusters of source devices or all source devices may be coupled to and/or decoupled from one or more sink devices and/or a compatibility device (e.g. through a buffer). Additional complexity in communication path alternatives may provide additional flexibility.

A communication message to or from a source or sink device may be selectively passed, filtered, modified and/or blocked (e.g. based on an analysis or interpretation of the message). A modified (e.g. edited) or replaced message may be provided to one or more intended and/or other recipients by a different communication path (e.g. through or from a compatibility device). Compatible messages may be passed to one or more intended recipients via an original (e.g. default or specification) path or via modified communication path.

A compatibility device or module may intervene in a configuration or in messaging as needed, e.g., for compatibility. A compatibility device or module may be implemented, for example, in an HDMI switch or audiovisual (AV) receiver. Individual or groups (e.g. clusters) of sink, source and/or compatibility devices may be coupled and decoupled by switches to configure and reconfigure one or more communication paths to block and/or modify messages (e.g. as needed for compatible configurations and/or messaging). A compatibility device may, effectively, extend a protocol to expand or eliminate limitations, which may permit an end-user (e.g. of HDMI-CEC) to connect and control otherwise incompatible configurations and devices. In an example, a communication protocol limitation, such as a limited number of types of devices or a total number of devices may be overcome, for example, by modifying an address in one or more communication messages. In another example, a malfunctioning device (e.g. transmitting a continuous active source message) may be decoupled from other devices.

In an example, a device (e.g. an HDMI switch) may be configured to selectively modify: (i) a communication path (e.g. HDMI-CEC) coupled to a sink device and a plurality of source devices and (ii) a communication message from the sink device or a source device among the plurality of source devices. Selective modification of a communication path may be based on a decision to modify or block a communication message to or from the sink device or at least one of the plurality of source devices. A decision to modify or block a communication message may be based on, for example, a determination to overcome a limitation of a communication protocol to achieve compatibility or on a determination that at least one of the plurality of source devices or a communication message therefrom is defective or incompatible with the sink device or at least one of the plurality of source devices.

An example device configuration may, for example, (i) selectively couple a compatibility device instead of the plurality of source devices to the sink device and/or (ii) selectively decouple one or more of the plurality of source devices from the sink device. Source devices may be separated into a first cluster of source devices and a second cluster of source devices. A compatibility device or module may selectively couple and decouple one or more of the clusters of source devices to the sink device, for example, to provide compatibility, such as providing addressing for more devices than a protocol may permit.

In an example, a compatibility device may be configured to detect an incompatibility between a plurality of communication devices including a plurality of source devices that send source communication messages and a sink device that sends sink communication messages and to block, modify or replace a sink or source message to or from a device among the plurality of communication devices causing the incompatibility. A compatibility device may (e.g. also) be configured, for example, to: (i) decouple the device causing the incompatibility from the other communication devices, (ii) decouple the plurality of source devices from the sink device while the plurality of source devices and the sink device are coupled to the compatibility device; (iii) couple and decouple the plurality of source devices to the compatibility device as a first cluster of source devices and a second cluster of source devices; and/or (iv) simultaneously couple to the plurality of source devices and the sink device while the plurality of source devices are also coupled to the sink device.

In an example procedure (e.g. method), a plurality of source devices configured to be coupled to and decoupled from a sink device may be monitored (e.g. by a compatibility device or module). A determination may be made that at least one of the plurality of source devices may be (e.g. is) incompatible. A message from the at least one incompatible source device may be blocked while compatible messages from other source devices are not blocked. A blocked message or other message may be modified or replaced with a proxy message (e.g. by a compatibility proxy). An incompatible source device may be decoupled (e.g. temporarily) from compatible source and sink devices. An incompatible source device and a compatible source device may be collectively coupled and decoupled to and from the sink device. Source devices may be coupled to and decoupled from the sink device as a first cluster of source devices, a second cluster of source devices, etc.

A. Sink-Only Proxy

FIG. 1 is an example of a communication system 100 with compatibility control and a reconfigurable communication path for a plurality of devices. The example shown in FIG. 1 may be referred to as a sink-only proxy configuration.

Communication system 100 comprises a device 105 with compatibility control 110, a plurality of HDMI devices (e.g. HDMI 1-HDMI 9), a first communication path 115 (e.g. HDMI-CEC), a second (e.g. alternate or HDMI-CEC proxy) communication path 120 and a switch S9.

Device 105 may comprise logic implemented in hardware (e.g., digital and/or analog circuits) or hardware and software (e.g., software or firmware running on a processor circuit or other hardware). Device 105 may comprise, for example, a processor, microprocessor, controller, system-on-a-chip (SoC), controller, etc. Device 105 may provide only compatibility control 110 or may be part of another device, such as an HDMI switch or HDMI repeater.

HDMI 1-HDMI 8 may be, for example, source devices such as a Blu-ray player, a set-top box (e.g. cable or satellite set-top box), a video game console, a DVD player, etc. HDMI 9 may be, for example, a sink device, such as an HDMI TV, a monitor, a receiver, etc.

Switch S9 may be, for example, a two position switch (e.g. SPDT) or a three-position switch (e.g. center OFF or open). A switch position may be a normally closed (NC) or default position while another switch position may be a normally open (NO) position. Switch S9 positions may be controlled, for example, by compatibility control 110. Examples or implementations may comprise any number of switches.

First and second communication paths 115, 120 may comprise one or more channels, conductors, etc. and may be based on a communication protocol such as HDMI-CEC. Examples or implementations may comprise any number of communication paths.

Compatibility control 110 may comprise one or more modules, submodules, components, subcomponents that perform one or more tasks pertaining to compatibility control. In the example shown in FIG. 1, compatibility control 110 comprises monitor 125, detect 130, switch control 135 and communication control 140. Compatibility control 110 (e.g. as it may be implemented in a wide variety of examples) may comprise additional or alternative components, modules, etc., such as a database (memory) reference of source and sink device manufacturers, devices, protocols, messages, etc.

Monitor 125 may, for example, monitor connected devices, configurations of devices, communications sent or received by devices, etc. For example, monitor 125 may collect/store information about attached devices, such as device ID, assigned address, device status (e.g. ON, OFF, active, inactive), messages sent or received, etc. Monitor 125 may, for example, utilize a protocol such as HDMI-CEC to probe devices for information, such as device identification and power state.

Detect 130 may, for example, detect an incompatibility (e.g. in a device or a message) based on one or more analyses of information provided by monitor 125. Detect 130 may process (e.g. interpret) communications. In an example, detect 130 may reference a database of source and sink device manufacturers, devices, protocols, etc. for one or more analyses (e.g. comparisons) to determine whether a device (e.g. its configuration of features, communication protocol, etc.) may be incompatible with one or more other devices that are or may be attached to a communication path. For example, detect 130 may determine whether commands issued by a user using a remote control for sink device HDMI 9 may not control one or more source devices HDMI 1-HDMI 8. In another example, detect 130 may determine that one or more devices have conflicting addresses or identifiers. In another example, detect 130 may determine that a device is in a defective state, incapacitating itself or other devices.

Switch control 135 may control reconfigurable communication paths, for example, by controlling one or more switches (e.g. S9). Source devices HDMI 1-HDMI 8 may be coupled (e.g. directly or indirectly) to sink device HDMI 9 via alternate communication paths, for example, based on control of switch S9. In a first position (e.g. a default or NC position), switch S9 may couple device 105 and source devices HDMI 1-HDMI 8 to sink device HDMI 9 via first communication path 115. In a second position (e.g. an NO position), switch S9 may couple source devices HDMI 1-HDMI 8 to sink device HDMI 9 through device 105 via first communication path 115 and second communication path 120. The various paths reroute communications. The first position may be selected, for example, when there is not a detected incompatibility. The second position may be selected, for example, to permit compatibility control 110 to process (e.g. block, modify or replace an incompatible communication with a proxy communication via a proxy path) to or from sink device HDMI 9 from or to a source device. The positions of switches may delineate what compatibility control 110 may and may not do. For example, communication system 100 is not provided with individual control of source devices HDMI 1-HDMI 8, such that each source device "sees" every message to and from every source device without filtering of messages to/from sources devices.

Communication control 140 may, for example, block, filter, modify or replace a communication (e.g. with a proxy communication) to resolve an incompatibility. Communication control 140 may reference a database of source and sink device manufacturers, devices, protocols, etc. to determine a compatibility resolution, such as one or more mappings or translations for communicated information (e.g. status, command). Communication control 140 may provide addressing, e.g., to render a device compatible. Communications with incorrect addressing may be modified as needed for compatibility.

Switch control 135 and communication control 140 may, e.g., individually or collectively, resolve detected incompatibilities to render an otherwise incompatible configuration and/or messaging compatible. One or more algorithms may indicate whether one or both switch control 135 and/or communication control 140 may resolve incompatibility. For example, switch control 135 may (e.g. alone) be applied to resolve a detected incompatibility based on a defective device (e.g. unless a proxy message such as a reset or power off/on command may restore compatible operation). In another example, such as when a message from one device may be mapped to another device, switch control 135 may control switch S9 to permit communication control 140 to provide a proxy message (e.g. a modified message or a replacement message) via second communication path 120 to resolve an incompatibility. In another example (e.g. when all devices are compatible), source devices HDMI 1-HDMI 8 may be coupled to sink device HDMI 9 via first communication path 115 and switch control 135 and communication control 140 may not intervene for lack of detected incompatibility.

B. Source-Only Switch

Figure 2:
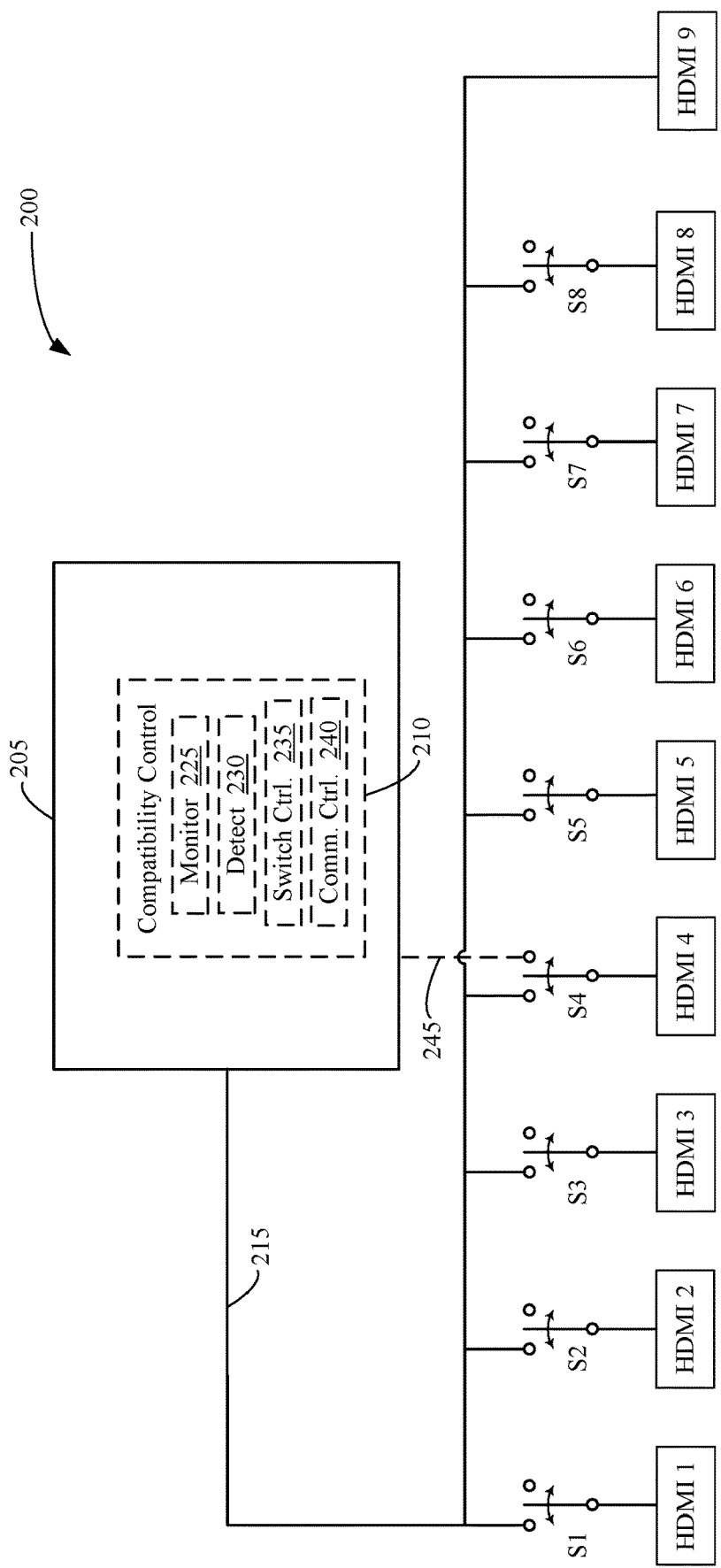
FIG. 2 is an example of a communication system with compatibility control and a reconfigurable communication path for individual devices.

FIG. 2 is an example of a communication system 200 with compatibility control and a reconfigurable communication path for individual devices. The example shown in FIG. 2 may be referred to as a source-only proxy configuration.

Communication system 200 comprises a device 205 with compatibility control 210, a plurality of HDMI devices (e.g. HDMI 1-HDMI 9), a first communication path 215 (e.g. HDMI-CEC) and switches S1-S8.

Device 205 may comprise logic implemented in hardware (e.g., digital and/or analog circuits) or hardware and software (e.g., software or firmware running on a processor circuit or other hardware). Device 205 may comprise, for example, a processor, microprocessor, controller, system-on-a-chip (SoC), controller, etc. Device 205 may provide only compatibility control 210 or may be part of another device, such as an HDMI switch or HDMI repeater.

HDMI 1-HDMI 8 may be, for example, source devices such as a Blu-ray player, a set-top box (e.g. cable or satellite set-top box), a video game console, a DVD player, etc. HDMI 9 may be, for example, a sink device, such as an HDMI TV, a monitor, a receiver, etc.

Switches S1-S8 may be, for example, two position switches (e.g. SPDT) or three-position switches (e.g. center OFF or open). A switch position may be a normally closed (NC) or default position while another switch position may be a normally open (NO) position. Positions (e.g. states) of switches S1-S8 may be controlled, for example, by compatibility control 210. Examples or implementations may comprise any number of switches. In an example, switches S1-S8 may provide three positions, such as coupled to first communication path 215, disconnected (e.g. center position), and connected to device 205 and/or compatibility control 210. A connection to compatibility control 210 (e.g. via optional dashed connection 245) may permit compatibility control 210 to control one or more (e.g. all) bidirectional communication on a device-by-device (individual) basis for devices that may need compatibility support. Note that optional or proxy communication path such as dashed connection 245 may be provided for one or more (e.g. all) switches S1-S8.

First communication path 215 may comprise one or more channels, conductors, etc. and may be based on a communication protocol such as HDMI-CEC. Examples or implementations may comprise any number of communication paths.

Compatibility control 210 may comprise one or more modules, submodules, components, subcomponents that perform one or more tasks pertaining to compatibility control. In an example shown in FIG. 2, compatibility control 210 may comprise, for example, monitor 225, detect 230, switch control 235 and communication control 240. Compatibility control 210 (e.g. as it may be implemented in a wide variety of examples) may comprise additional or alternative components, modules, etc., such as a database (memory) reference of source and sink device manufacturers, devices, protocols, messages, etc.

Monitor 225 may, for example, monitor connected devices, configurations of devices, communications sent or received by devices, etc. For example, monitor 225 may collect/store information about attached devices, such as device ID, assigned address, device status (e.g. ON, OFF, active, inactive), messages sent or received, etc. Monitor may, for example, utilize a protocol such as HDMI-CEC to probe devices for information, such as device identification and power state.

Detect 230 may, for example, detect an incompatibility (e.g. in a device or a message) based on one or more analyses of information provided by monitor 225. Detect 230 may process (e.g. interpret) communications. In an example, detect 230 may reference a database of source and sink device manufacturers, devices, protocols, etc. for one or more analyses (e.g. comparisons) to determine whether a device (e.g. its configuration of features, communication protocol, etc.) may be incompatible with one or more other devices that are or may be attached to a communication path. For example, detect 230 may determine whether commands issued by a user using a remote control for sink device HDMI 9 may not control one or more source devices HDMI 1-HDMI 8. In another example, detect 230 may determine that one or more devices have conflicting addresses or identifiers. In another example, detect 230 may determine that a device is in a defective state, incapacitating itself or other devices.

Switch control 235 may control reconfigurable communication paths, for example, by controlling one or more switches (e.g. S1-S8). Source devices HDMI 1-HDMI 8 may be coupled (e.g. directly or indirectly) to sink device HDMI 9 via alternate communication paths, for example, based on control of switches S1-S8 using an alternate or proxy path such as optional communication path 245. In a first position (e.g. a default or NC position), switches S1-S8 (e.g. on an individual basis) may couple device 205 and source devices HDMI 1-HDMI 8 to sink device HDMI 9 via first communication path 215. In a second position (e.g. an NO position), switches S1-S8 may (e.g. on an individual basis) couple source devices HDMI 1-HDMI 8 to sink device HDMI 9 through device 205 via first communication path 215 and optional communication paths 245. In an alternate second position (e.g. in a two position switch) or a third position (e.g. for a three position switch), source devices HDMI 1-HDMI 8 may be disconnected (e.g. isolated) from other devices. The various paths permit communications to be rerouted and, if need be, processed by compatibility control 210. The first position of a switch (e.g. for a respective device) may be selected, for example, when there is not a detected incompatibility. The second position may be selected, for example, to permit compatibility control 210 to process (e.g. block, modify or replace an incompatible communication with a proxy communication via proxy path 245) to or from sink device HDMI 9 from or to a source device HDMI 1-HDMI 8. A third position may be selected, for example, to isolate a defective device or to selectively filter what messages devices may "see."

Communication control 240 may, for example, block, filter, modify or replace a communication (e.g. with a proxy communication) to resolve an incompatibility. Capabilities may vary depending on whether a proxy path (e.g. alternate path 245) is provided between source and sink devices. Communication control 240 may reference a database of source and sink device manufacturers, devices, protocols, etc. to determine a compatibility resolution, such as one or more mappings or translations for communicated information (e.g. status, command). Communication control 240 may provide addressing, e.g., to render a device compatible. Communications with incorrect addressing may be modified as needed for compatibility.

Switch control 235 and communication control 240 may, e.g., individually or collectively, resolve detected incompatibilities to render an otherwise incompatible configuration and/or messaging compatible. One or more algorithms may indicate whether one or both switch control 235 and/or communication control 240 may resolve incompatibility. For example, switch control 235 may (e.g. alone) be applied to resolve a detected incompatibility based on a defective device (e.g. unless a proxy message such as a reset or power off/on command may restore compatible operation). In another example, such as when a message from one device may be mapped to another device for compatibility, switch control 235 may control a switch S1-S8 to permit communication control 240 to provide a proxy message (e.g. a modified message or a replacement message) via proxy communication path 245 to resolve an incompatibility. In another example (e.g. when all devices are compatible), source devices HDMI 1-HDMI 8 may be coupled to sink device HDMI 9 via first communication path 215 and switch control 235 and communication control 240 may not intervene for lack of detected incompatibility.

C. Full Proxy

Figure 3:
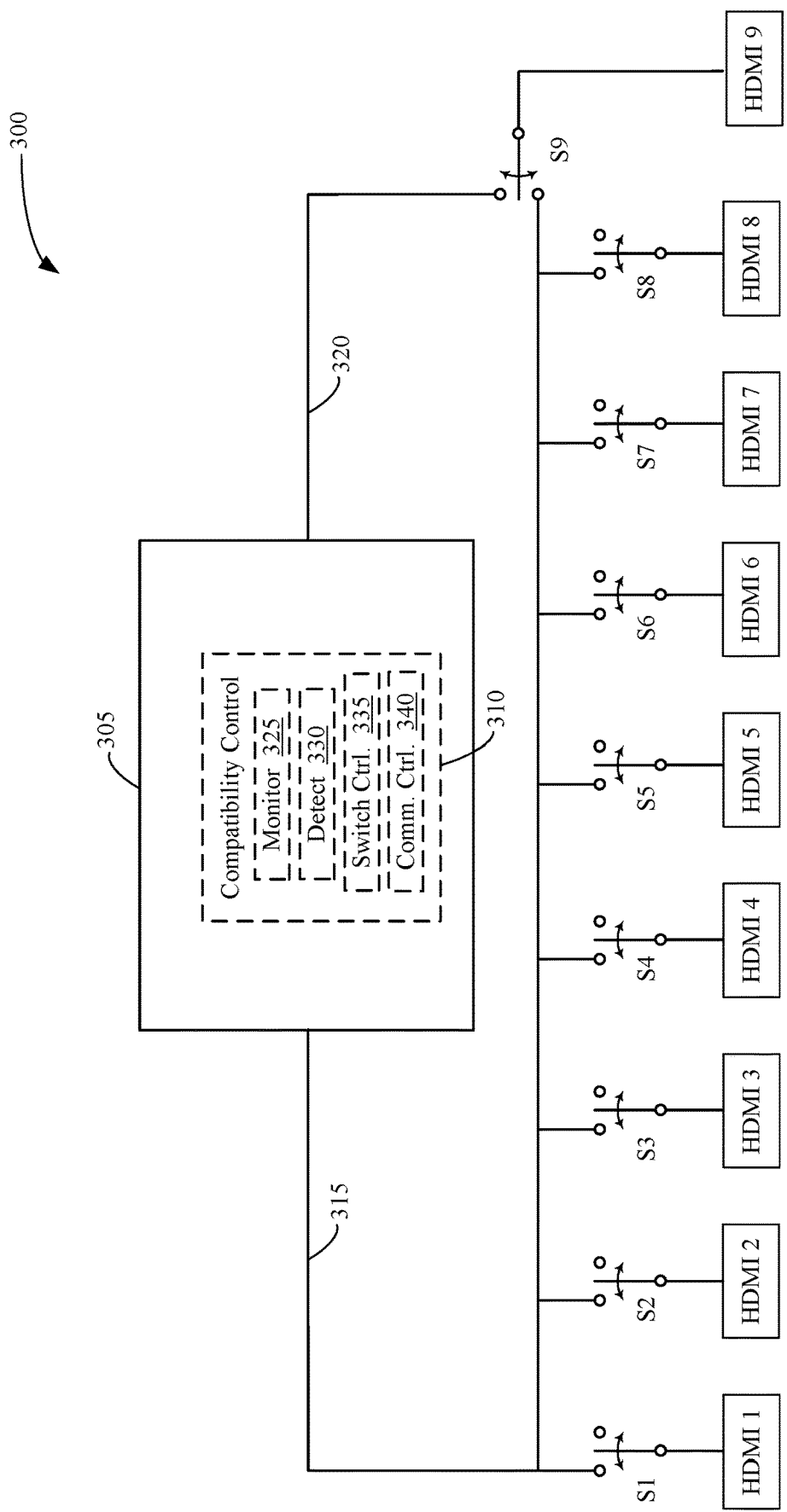
FIG. 3 is an example of a communication system with compatibility control and a reconfigurable communication path for individual devices and a group of devices.

FIG. 3 is an example of a communication system 300 with compatibility control and a reconfigurable communication path for individual devices and a group of devices. The example shown in FIG. 3 may be referred to as a full proxy configuration. This configuration may permit each message regardless of source to be routed to source and/or sink devices and re-routed (e.g. as needed to compatibility device 305).

Compatibility system 300 comprises a device 305 with compatibility control 310, a plurality of HDMI devices (e.g. HDMI 1-HDMI 9), a first communication path 315 (e.g. HDMI-CEC), a second (e.g. alternate or HDMI-CEC proxy) communication path 320 and switches S1-S9.

Device 305 may comprise logic implemented in hardware (e.g., digital and/or analog circuits) or hardware and software (e.g., software or firmware running on a processor circuit or other hardware). Device 305 may comprise, for example, a processor, microprocessor, controller, system-on-a-chip (SoC), controller, etc. Device 305 may provide only compatibility control 310 or may be part of another device, such as an HDMI switch or HDMI repeater.

HDMI 1-HDMI 8 may be, for example, source devices such as a Blu-ray player, a set-top box (e.g. cable or satellite set-top box), a video game console, a DVD player, etc. HDMI 9 may be, for example, a sink device, such as an HDMI TV, a monitor, a receiver, etc.

Switches S1-S9 may be, for example, two position switches (e.g. SPDT) or three-position switches (e.g. center OFF or open). A switch position may be a normally closed (NC) or default position while another switch position may be a normally open (NO) position. Positions (e.g. states) of switches S1-S9 may be controlled, for example, by compatibility control 310. Examples or implementations may comprise any number of switches. In an example, switches S1-S8 may be controlled to couple source devices HDMI 1-HDMI 8, respectively, to first communication path 315 or to disconnect them. Switch S9 may be controlled to couple source devices HDMI 1-HDMI 8 to sink device HDMI 9 via first communication path 315 or via first and second communication paths 315, 320 through device 305, depending on the states of switches S1-S8.

First communication path 315 may comprise one or more channels, conductors, etc. and may be based on a communication protocol such as HDMI-CEC. Examples or implementations may comprise any number of communication paths.

Compatibility control 310 may comprise one or more modules, submodules, components, subcomponents that perform one or more tasks pertaining to compatibility control. In an example shown in FIG. 3, compatibility control 310 may comprise, for example, monitor 325, detect 330, switch control 335 and communication control 340. Compatibility control 310 (e.g. as it may be implemented in a wide variety of examples) may comprise additional or alternative components, modules, etc., such as a database (memory) reference of source and sink device manufacturers, devices, protocols, messages, etc.

Monitor 325 may, for example, monitor connected devices, configurations of devices, communications sent or received by devices, etc. For example, monitor 325 may collect/store information about attached devices, such as device ID, assigned address, device status (e.g. ON, OFF, active, inactive), messages sent or received, etc. Monitor may, for example, utilize a protocol such as HDMI-CEC to probe devices for information, such as device identification and power state.

Detect 330 may, for example, detect an incompatibility (e.g. in a device or a message) based on one or more analyses of information provided by monitor 325. Detect 330 may process (e.g. interpret) communications. In an example, detect 330 may reference a database of manufacturers, devices, protocols, etc. for one or more analyses (e.g. comparisons) to determine whether a device (e.g. its configuration of features, communication protocol, etc.) may be incompatible with one or more other devices that are or may be attached to a communication path. For example, detect 330 may determine whether commands issued by a user using a remote control for sink device HDMI 9 may not control one or more source devices HDMI 1-HDMI 8. In another example, detect 330 may determine that one or more devices have conflicting addresses or identifiers. In another example, detect 330 may determine that a device is in a defective state, incapacitating itself or other devices.

Switch control 335 may control reconfigurable communication paths, for example, by controlling one or more switches (e.g. S1-S9). Source devices HDMI 1-HDMI 8 may be coupled (e.g. directly or indirectly) to sink device HDMI 9 via alternate communication paths, for example, based on control of switches S1-S9 using an alternate or proxy path such as second communication path 320. In a first position (e.g. a default or NC position), switches S1-S9 (e.g. on an individual basis) may couple device 305 and source devices HDMI 1-HDMI 8 to sink device HDMI 9 via first communication path 315. In a second position for switch S9 (e.g. an NO position), switches S1-S8 may (e.g. on an individual basis) couple source devices HDMI 1-HDMI 8 to sink device HDMI 9 through device 305 via first communication path 315 and second communication paths 320. In second position for switches S1-S8 (e.g. an NO position), source devices HDMI 1-HDMI 8 may be (e.g. individually) disconnected (e.g. isolated) from other devices. The various paths permit communications to be rerouted and, if need be, processed by compatibility control 310. The first position of a switch (e.g. for a respective device) may be selected, for example, when there is not a detected incompatibility. The second position may be selected, for example, to permit compatibility control 310 to process (e.g. interpret, block, filter, modify or replace an incompatible communication with a proxy communication via second communication path 320) to or from sink device HDMI 9 from or to a source device HDMI 1-HDMI 8. The second position of switches S1-S8 may (e.g. also) be selected, for example, to isolate a defective device or to selectively filter what messages devices may "see."

Communication control 340 may, for example, block, filter, modify or replace a communication (e.g. with a proxy communication) to resolve an incompatibility. Communication control 340 may reference a database of manufacturers, devices, protocols, etc. to determine a compatibility resolution, such as one or more mappings or translations for communicated information (e.g. status, command). Communication control may provide addressing, e.g., to render a device compatible. Communications with incorrect addressing may be modified as needed for compatibility.

Switch control 335 and communication control 340 may, e.g., individually or collectively, resolve detected incompatibilities to render an otherwise incompatible configuration and/or messaging compatible. One or more algorithms may indicate whether one or both switch control 335 and/or communication control 340 may resolve incompatibility. For example, switch control 335 may (e.g. alone) be applied to resolve a detected incompatibility based on a defective device (e.g. unless a proxy message such as a reset or power off/on command may restore compatible operation). In another example, such as when a message from one device may be mapped to another device for compatibility, switch control 335 may control one or more switches S1-S9 to permit communication control 340 to provide a proxy message (e.g. a modified message or a replacement message) via second (e.g. proxy) communication path 320 to resolve an incompatibility. In another example (e.g. when all devices are compatible), source devices HDMI 1-HDMI 8 may be coupled to sink device HDMI 9 via first communication path 315 and switch control 335 and communication control 340 may not intervene for lack of detected incompatibility.

D. Proxy with Source Cluster

Figure 4:
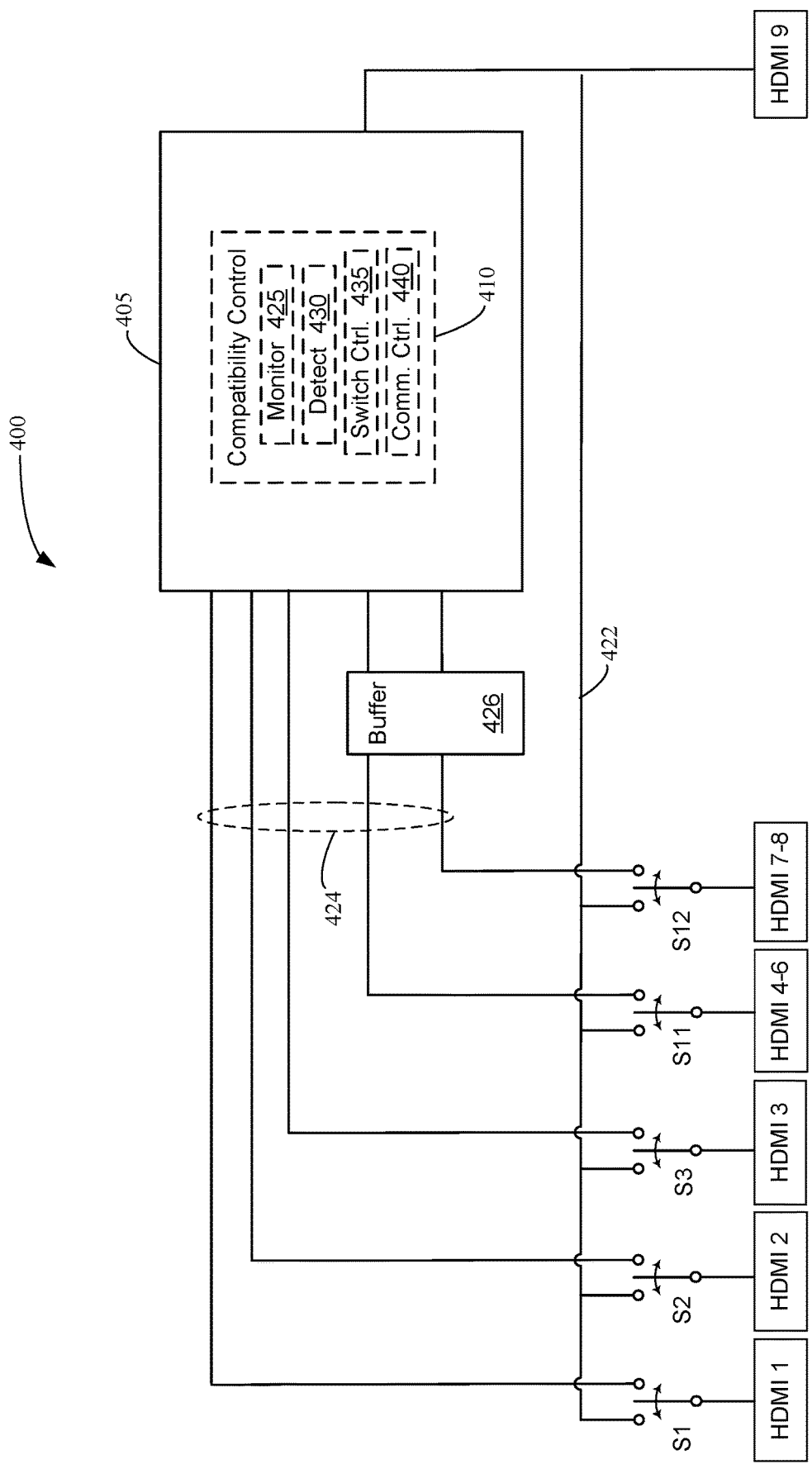
FIG. 4 is an example of a communication system with compatibility control and a reconfigurable communication path for clusters of devices.

FIG. 4 is an example of a communication system 400 with compatibility control and a reconfigurable communication path for clusters of devices. The example shown in FIG. 4 may be referred to as an cluster proxy configuration.

Communication system 400 comprises device 405 with compatibility control 410, a plurality of HDMI devices (e.g. HDMI 1-HDMI 9), first communication path 422 (e.g. HDMI-CEC), second communication path 424, switches S1-S3, S11 and S12 and buffer 426.

Device 405 may comprise logic implemented in hardware (e.g., digital and/or analog circuits) or hardware and software (e.g., software or firmware running on a processor circuit or other hardware). Device 405 may comprise, for example, a processor, microprocessor, controller, system-on-a-chip (SoC), controller, etc. Device 405 may provide only compatibility control 410 or may be part of another device, such as an HDMI switch or HDMI repeater.

HDMI devices HDMI 1-HDMI 8 may be, for example, source devices such as a Blu-ray player, a set-top box (e.g. cable or satellite set-top box), a video game console, a DVD player, etc. HDMI device HDMI 9 may be, for example, a sink device, such as an HDMI TV, a monitor, a receiver, etc. Source devices HDMI 1-HDMI 8 may be organized into clusters, for example, as shown in FIG. 4, where source devices HDMI 1-3 form a first cluster, source devices HDMI 4-6 form a second cluster and source devices HDMI 7-8 form a third cluster.

Switches S1-S3, S11 and S12 may be, for example, two position switches (e.g. SPDT) or three-position switches (e.g. center OFF or open). A switch position may be a normally closed (NC) or default position while another switch position may be a normally open (NO) position. Positions (e.g. states) of switches S1-S3, S11 and S12 may be controlled, for example, by compatibility control 410. Examples or implementations may comprise any number of switches. In an example, switches S1-S3, S11 and S12 may provide three positions, such as being coupled to first communication path 422, disconnected (e.g. center position) and coupled to second communication path 424. Switch S1 may switch first source device HDMI 1 between two or more positions. Switch S2 may switch second source device HDMI 2 between two or more positions. Switch S3 may switch third source device HDMI 3 between two or more positions. Switch S11 may switch a second cluster of source devices HDMI 4-6 between two or more positions. Switch S12 may switch a third cluster of source devices HDMI 7-8 between two or more positions.

First and second communication paths 422, 424 may each comprise one or more channels, conductors, etc. and may be based on a communication protocol such as HDMI-CEC. In an example, e.g. as shown in FIG. 4, second communication path 424 may comprise separate communication paths (e.g. three paths), such as one path for each cluster of source devices. Second communication path 424 may comprise a buffer 426 (e.g. a high speed buffer), for example, to maintain low capacitance (e.g. for error free communication). Examples or implementations may comprise any number of clusters and/or separated or combined communication paths.

Compatibility control 410 may comprise one or more modules, submodules, components, subcomponents that perform one or more tasks pertaining to compatibility control. In an example shown in FIG. 4, compatibility control 410 may comprise, for example, monitor 425, detect 430, switch control 435 and communication control 440. Compatibility control 410 (e.g. as it may be implemented in a wide variety of examples) may comprise additional or alternative components, modules, etc., such as a database (memory) reference of source and sink device manufacturers, devices, protocols, messages, etc.

Monitor 425 may, for example, monitor connected devices, configurations of devices, communications sent or received by devices, etc. For example, monitor 425 may collect/store information about attached devices, such as device ID, assigned address, device status (e.g. ON, OFF, active, inactive), messages sent or received, etc. Monitor may, for example, utilize a protocol such as HDMI-CEC to probe devices for information, such as device identification and power state.

Detect 430 may, for example, detect an incompatibility (e.g. in a device or a message) based on one or more analyses of information provided by monitor 425. Detect 430 may process (e.g. interpret) communications. In an example, detect 430 may reference a database of source and sink device manufacturers, devices, protocols, etc. for one or more analyses (e.g. comparisons) to determine whether a device (e.g. its configuration of features, communication protocol, etc.) may be incompatible with one or more other devices that are or may be attached to a communication path. For example, detect 430 may determine whether commands issued by a user using a remote control for sink device HDMI 9 may not control one or more source devices HDMI 1-HDMI 8. In another example, detect 430 may determine that one or more devices may have conflicting addresses or identifiers. In another example, detect 430 may determine that a device may be in a defective state, incapacitating itself or other devices.

Switch control 435 may control reconfigurable communication paths, for example, by controlling one or more switches (e.g. S1-S3, S11 or S12). Source devices HDMI 1-HDMI 8 may be coupled (e.g. directly or indirectly) to sink device HDMI 9 via alternate communication paths, for example, based on control of switches S1-S3, S11 or S12. In a first position, switches S1-S3, S11 or S12 may couple source devices HDMI 1-3 (individually), HDMI 4-6 (as a cluster) and HDMI 7-8 (as a cluster) to sink device HDMI 9 via first communication path 422. In a second position, switches S1-S3, S11 or S12 may couple source devices HDMI 1-3 (individually), HDMI 4-6 (as a cluster) and HDMI 7-8 (as a cluster) to sink device HDMI 9 through device 405 via second communication path 424 and first communication path 422. In an (e.g. optional) third position (e.g. for a three position switch), source devices HDMI 1-3 (individually), HDMI 4-6 (as a cluster) and HDMI 7-8 (as a cluster) may be disconnected (e.g. isolated) from other devices. The various paths permit communications to be rerouted and, if need be, processed by compatibility control 410. The first position of a switch (e.g. for a respective device) may be selected, for example, when there is not a detected incompatibility. The second position may be selected, for example, to permit compatibility control 410 (e.g. block, modify or replace an incompatible communication with a proxy communication). A third position may be selected, for example, to isolate a defective device or to selectively filter what messages devices may "see."

The example shown in FIG. 4 illustrates one of many possible configurations. In the example shown, there is a heterogeneous mixture of individual and cluster connectivity of source devices. Any number of devices many be individually connected/disconnected and any number of devices may be connected/disconnected as clusters. Other examples may be homogenous, e.g., all source devices may be individually connected/disconnected or all source devices may be connected/disconnected in clusters.

Individually isolated source devices (e.g. HDMI 1, HDMI 2, HDMI 3) may be coupled to device (e.g. smart switch) 405 as separate CEC lines indicated by dashed lasso identifying second communication path 424. Individually isolated source devices (e.g. HDMI 1, HDMI 2, HDMI 3) as well as device 405 may be coupled to sink device HDMI 9 via a common CEC line indicated by first communication path 422. Switches S1-S3, S11 and S12 provide an ability to configure individual (e.g. isolated) connections between source devices HDMI 1-3 with device 405 and sink device HDMI 9.

Individually controlled source devices (e.g. HDMI 1-3 in the example shown in FIG. 4) may operate at a preferred logical address, which may avoid multiple devices attempting to take the same logical address.

In an example, Communication messages (e.g. CEC messages) between source devices HDMI 1-8 and sink device HDMI 9 may be transmitted (e.g. directly) via first communication path 422 or (e.g. indirectly) via second communication path 424, through device 405 back to first communication path 422. Communications between source and sink devices may be fully acted on by device 405. Device 405 (e.g. smart HDMI switch) may provide full CEC functionality for any number of HDMI (e.g. CEC) devices that may reside in a chain of devices.

Communication control 440 may, for example, block, filter, modify or replace a communication (e.g. with a proxy communication) to resolve an incompatibility. Communication control 440 may reference a database of source and sink device manufacturers, devices, protocols, etc. to determine a compatibility resolution, such as one or more mappings or translations for communicated information (e.g. status, command). Communication control may provide addressing, e.g., to render a device compatible. Communications with incorrect addressing may be modified as needed for compatibility. Communications (e.g. messages) transmitted by a source device S1-S8 or sink device HDMI 9 may be fully acted upon (e.g. monitored, passed, interpreted, filtered and/or blocked) by compatibility control 410.

Switch control 435 and communication control 440 may, e.g., individually or collectively, resolve detected incompatibilities to render an otherwise incompatible configuration and/or messaging compatible. One or more algorithms may indicate whether one or both switch control 435 and/or communication control 440 may resolve incompatibility. For example, switch control 435 may (e.g. alone) be applied to resolve a detected incompatibility based on a defective device (e.g. unless a proxy message such as a reset or power off/on command may restore compatible operation). In another example, such as when a message from one device may be mapped to another device for compatibility, switch control 435 may control a switch S1-S3, S11 or S12 to permit communication control 440 to provide a proxy message (e.g. a modified message or a replacement message) to resolve an incompatibility. In another example (e.g. when all devices are compatible), source devices HDMI 1-HDMI 8 may be coupled to sink device HDMI 9 via first communication path 422 and switch control 435 and communication control 440 may not intervene for lack of detected incompatibility.

In an example, source devices HDMI 1-3 (individually), HDMI 4-6 (as a cluster) and HDMI 7-8 (as a cluster) may be coupled to device 405 or compatibility control 410 via a separate control line (e.g. a CEC line) while sink device HDMI 9 may be coupled to device 405 or compatibility control 410 via another control line. This configuration may support overcoming a CEC protocol limitation of no more than three devices of a particular type that can be controlled. In other words, compatibility control 410 may provide protocol extension. Compatibility control 410 (e.g. communication path reconfiguration and/or proxy communication) may uniquely identify and control (e.g. on behalf of an end-user) all devices in a CEC chain. In an example, device 405 may use six general purpose input/outputs (GPIOs), for example, three GPIOs to handle CEC commands and three GPIOs to control relays.

III. Examples of Resolving Incompatibility in an HDMI-CEC Chain

Figure 5:
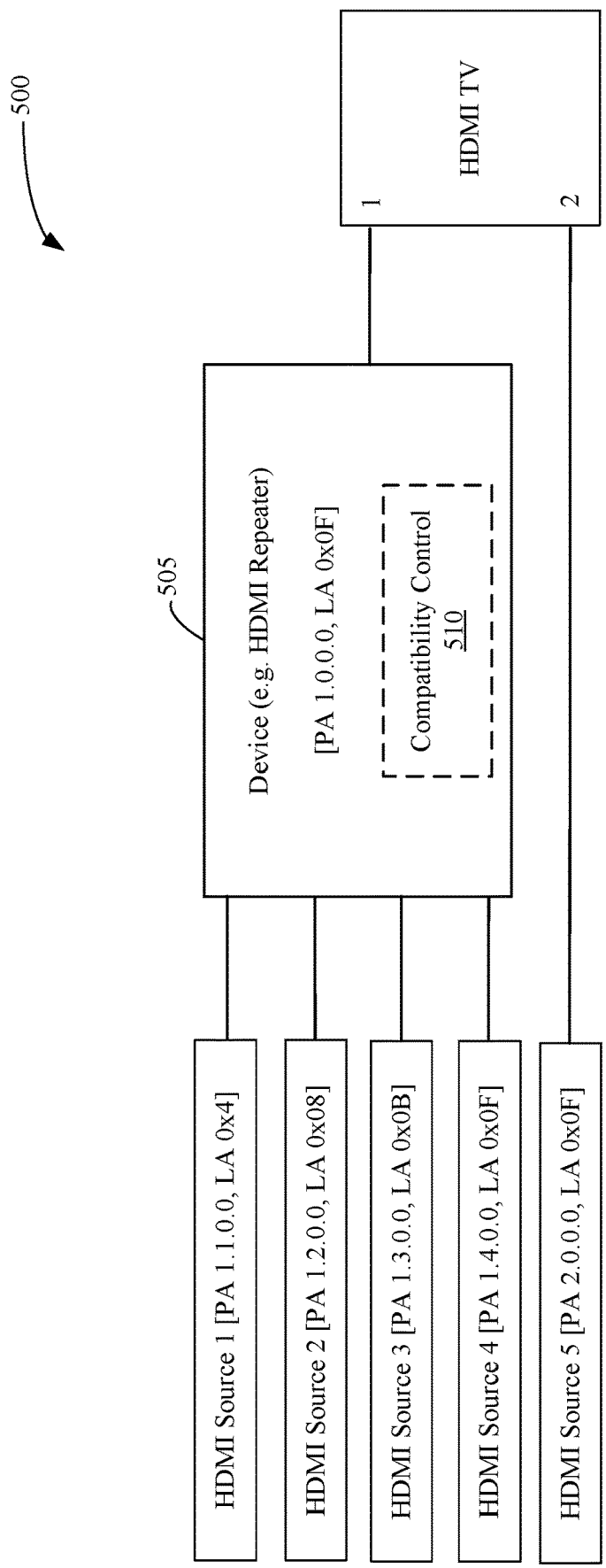
FIG. 5 is an example of a communication system with compatibility control and a reconfigurable communication path for source devices assigned a physical and logical address.

FIG. 5 is an example of a communication system 500 with compatibility control and a reconfigurable communication path for source devices assigned a physical and logical address. In an example (e.g. as shown in FIG. 5), communication system 500 comprises sink device HDMI TV, source devices HDMI Source 1-5 and device 505 (e.g. an HDMI repeater), which may be implemented with compatibility control (e.g. compatibility control 510, which may be implemented in a substantially similar manner to any of compatibility control 110, compatibility control 210, compatibility control 310, or compatibility control 410, as previously described). Sink device HDMI TV is shown with two HDMI connections (e.g. ports) 1, 2. Four source devices HDMI Source 1-4 are coupled to sink device HDMI TV connection 1 through device 505 while source device HDMI Source 5 is coupled to sink device HDMI TV connection 2. In an example, device 505 and source devices HDMI Source 1-5 are each provided with a physical address (PA) and a logical address (LA).

Following are examples of problems (discussed with respect to communication system 500) that may be resolved by compatibility control (e.g. as described in examples herein or in other examples/implementations.

A. Continuous Active Source

An example problem may be a continuous active source transmission. Rogue devices in a communication chain may send continuous active source messages. Such messages may be transmitted by a source device. Continuous active source messages may cause all devices in a chain to switch to an HDMI port, thereby enabling audio/video from that source device to be provided to the sink device. A continuous active source message may include a physical address of a transmitting source device.

Physical addresses may be determined, for example, based on the position of the source device with respect to a sink device (e.g. a TV). In an example, an HDMI switch may be assigned a physical address of 1.0.0.0, for example, when the HDMI switch is connected to a first HDMI port (e.g. HDMI 1) of the TV. A source device connected to a first HDMI port of an HDMI switch may be assigned a physical address of 1.1.0.0, a source device connected to the second HDMI port of the HDMI switch may be assigned a physical address of 1.2.0.0, etc. (e.g. as shown by example in FIG. 5).

Logical addresses may be provided, for example, by devices depending on their functionality (e.g. playback, recording, tuner, etc. types of devices), for example, as indicated by a CEC specification. A logical address may be provided, for example, after negotiating on a CEC chain with other devices. Other dedicated addresses in a CEC chain, e.g., except for an unregistered logical address, may be unique in the chain.

A problem caused by a rogue device sending continuous active source messages may be that a sink device (e.g. HDMI TV) may be switched to an HDMI port irrespective of an HDMI port that may be currently selected (e.g. by an end user controlling the sink device). In an example, HDMI TV may have currently selected HDMI Source 5. A rogue source device may be, for example, HDMI Source 1. HDMI TV may frequently (and incorrectly) switch to port 1 (e.g. for HDMI Source 1) even when it is on port 2 (e.g. for HDMI Source 5).

This incompatibility (e.g. problem) may be resolved, for example, by (e.g. compatibility control 510) isolating a rogue device (e.g. HDMI Source 1) from the CEC chain by monitoring messages sent by source devices, detecting the problem and controlling one or more switches to isolate the rogue device. For example, upon detecting that a rogue source device may be (e.g. is) sending continuous active source messages, compatibility control may send a command to a switch to cause the switch to disconnect the rogue source device from other devices in the CEC chain.

B. Incorrect Active Source

An example problem may be an incorrect active source message. For example, a rogue source device in a communication (e.g. HDMI-CEC) chain may send an active source message with an incorrect physical address. A sink device (e.g. HDMI TV) may (e.g. as a result) switch to an incorrect port. In an example, HDMI TV may switch to port 2, for example, when HDMI Source 2 may send an incorrect physical address 2.0.0.0.

A device with compatibility control (e.g. compatibility control 510) may resolve such an incompatibility (e.g. erroneous active source message), for example, by monitoring and interpreting messages, detecting problems and modifying or replacing messages transmitted by source devices with the correct physical address.

C. Controlling a Device Having an Unregistered Logical Address

An example problem may be an inability to control a device (e.g. because it may have an unregistered logical address). In an example, the HDMI-CEC specification permits only three devices of a particular logical group in an HDMI chain. Additional (e.g. fourth, fifth) devices may be assigned an unregistered logical address. A logical address may be assigned to a device, for example, based on a device's functionality (e.g. device types such as playback, recording, tuner, etc.). Logical address assignment may occur after a negotiation process with other devices on a CEC chain.

Logical addresses (e.g. except for unregistered logical addresses) may be unique (e.g. as shown by example in FIG. 5). For example, as shown in FIG. 5, HDMI Source 1 has a physical address of 1.1.0.0 and a logical address of 0x4, HDMI Source 2 has a physical address of 1.2.0.0 and a logical address of 0x08, HDMI Source 3 has a physical address of 1.3.0.0 and a logical address of 0x0B, HDMI Source 4 has a physical address of 1.4.0.0 and a logical address of 0x0F, device 505 (e.g. HDMI repeater) has a physical address of 1.0.0.0 a logical address of 0x0F and HDMI Source 5 has a physical address of 2.0.0.0 and a logical address of 0x0F.

HDMI Source 4 and HDMI Source 5 may not be assigned a registered logical address. HDMI Source 4 and HDMI Source 5 may obtain an unregistered logical address (e.g. 0x0F). HDMI Source 4 and HDMI Source 5 are may not be controllable (e.g. by an end-user using a remote control for sink device HDMI TV), for example, when commands (e.g. control messages) may be (e.g. are) directed to a device using a registered logical address. In an example, a remote control pass-through command (e.g. "Play") may be sent by a sink device. The command message may include the destination device's registered logical address as a parameter, for example, so the destination device can perform the requested operation.

The incompatibility may be resolved, for example, by compatibility control (e.g. compatibility control 510). In an example, e.g., as shown in FIG. 4, source devices of a type numbering more than permitted by a communication protocol may be clustered, grouped or otherwise exposed to sink device ports to overcome a limitation and associated addressing issues. For example, as shown by example in FIG. 5, HDMI TV is exposed to two source devices via port 1 and port 2, even though there are five source devices. HDMI Source 4 and HDMI Source 5 may not be aware of other source devices and may obtain a logical address that defines their functionality. Device 505 (e.g. HDMI repeater) may be aware of how source devices are configured. Compatibility control 510 may interpret a message, detect the problem, modify it and send the modified message to the sink device HDMI TV as though it was an original message sent by device 505 (e.g. HDMI repeater). Sink device HDMI TV may respond to the message. Compatibility control 510 may interpret the response, detect the problem, modify it and send the modified response to the correct source device. In this way, every source device (including those outside a communication protocol) may be uniquely identified and controlled (e.g. by extending the protocol).

IV. Example Procedure to Resolve Incompatibility

Compatibility control may be implemented, for example, in the form of operations, procedures or methods.

Figure 6:
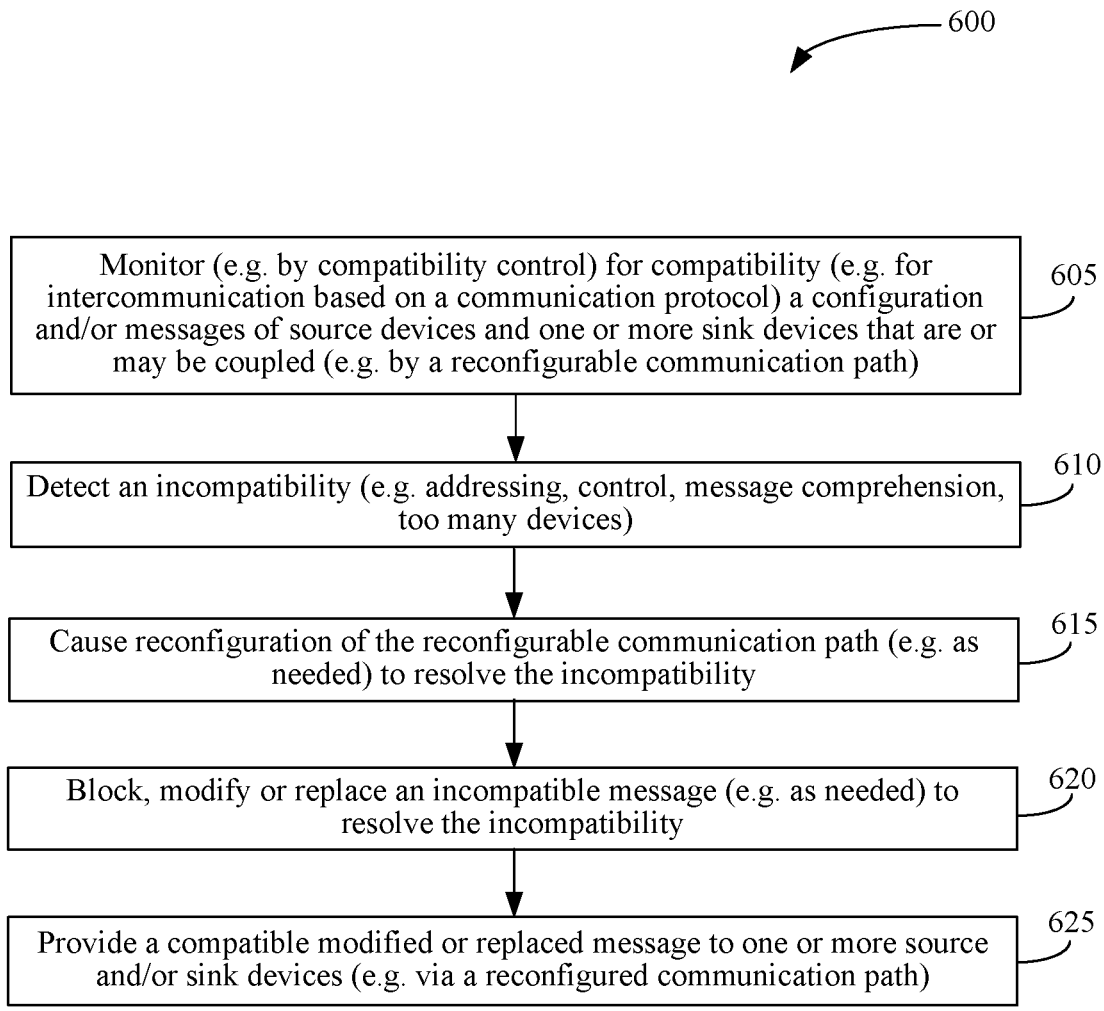
FIG. 6 is an example procedure to resolve incompatibility by reconfiguring a communication path and/or blocking, modifying or replacing communication messages.

FIG. 6 is an example procedure 600 to resolve incompatibility by reconfiguring a communication path and/or blocking, modifying or replacing communication messages. Example procedure 600 comprises example steps 605-625. No order of steps is required unless expressly indicated or inherently required. Operations may be performed out of order, in an alternate sequence, or partially (or completely) concurrently with each other or with other operations. There is no requirement that an implementation implement all of the operations illustrated in the example shown in FIG. 6. Other examples may not implement one or more operations described in example procedure 600. Other implementations may implement example operations shown in FIG. 6 in any order with or without other operations. FIG. 6 is simply one of many possible examples of subject matter disclosed herein. Embodiments may implement fewer, more or different steps. Other structural and operational embodiments will be apparent to persons skilled in the relevant art(s) based on discussion herein.

In example step 605, a configuration and/or messages of source devices and one or more sink devices that are or may be coupled (e.g. by a reconfigurable communication path) may be monitored (e.g. by compatibility control) for compatibility (e.g. for intercommunication based on a communication protocol). For example, as shown and discussed with respect to FIGS. 1-5, any of compatibility control 110 (e.g., monitor 125), compatibility control 210 (e.g., monitor 225), compatibility control 310 (e.g., monitor 325), compatibility control 410 (e.g., monitor 425), or compatibility control 510 may monitor a configuration and/or messages of source devices (e.g. HDMI 1-8 or HDMI Source 1-5) and one or more sink devices (e.g. HDMI 9 or HDMI TV) that are or may be coupled (e.g. by a reconfigurable communication path such as first and second communication paths 115, 120 in FIG. 1, first communication path 215 and optional path 245 in FIG. 2, first and second communication paths 315, 320 in FIG. 3, or first and second communication paths 422, 424 in FIG. 4) for compatibility (e.g. for intercommunication based on a communication protocol such as HDMI-CEC).

In example step 610, an incompatibility (e.g. addressing, control, message comprehension, too many devices) may be detected (e.g. based on monitored information). For example, as shown and discussed with respect to FIGS. 1-5, any of compatibility control 110 (e.g., detect 130), compatibility control 210 (e.g., detect 230), compatibility control 310 (e.g., detect 330), compatibility control 410 (e.g., detect 430), or compatibility control 510 may detect an incompatibility among source devices (e.g. HDMI 1-8 or HDMI Source 1-5) and/or with one or more sink devices (e.g. HDMI 9 or HDMI TV).

In example step 615, a reconfigurable communication path may be reconfigured (e.g. as needed) to resolve the incompatibility. For example, as shown and discussed with respect to FIGS. 1-5, any of compatibility control 110 (e.g., switch control 135), compatibility control 210 (e.g., switch control 235), compatibility control 310 (e.g., switch control 335), compatibility control 410 (e.g., switch control 435), or compatibility control 510 may reconfigure a communication path (e.g. second communication path 120, optional path 245, second communication path 320 or second communication path 424) for one or more source devices (e.g. HDMI 1-8 or HDMI Source 1-5) and one or more sink devices (e.g. HDMI 9 or HDMI TV).

In example step 620, an incompatible message may be blocked, modified or replaced (e.g. as needed) to resolve the incompatibility. For example, as shown and discussed with respect to FIGS. 1-5, any of compatibility control 110 (e.g. communication control 140), compatibility control 210 (e.g., communication control 240), compatibility control 310 (e.g., communication control 340), compatibility control 410 (e.g., communication control 440), or compatibility control 510 may block, modify or replace one or more incompatible messages by one or more source devices (e.g. HDMI 1-8 or HDMI Source 1-5) and/or one or more sink devices (e.g. HDMI 9 or HDMI TV).

In example step 625, a compatible modified or replaced message may be provided to one or more source and/or sink devices (e.g. via a reconfigured communication path). For example, as shown and discussed with respect to FIGS. 1-5, any of compatibility control 110 (e.g., communication control 140 and switch control 135), compatibility control 210 (e.g., communication control 240 and switch control 235), compatibility control 310 (e.g., communication control 340 and switch control 335), compatibility control 410 (e.g., communication control 440 and switch control 435), or compatibility control 510 may provide a modified or replaced message to one or more source devices (e.g. HDMI 1-8 or HDMI Source 1-5) and one or more sink devices (e.g. HDMI 9 or HDMI TV), for example, via second communication path 120, optional path 245, second communication path 320, or second communication path 424.

Example compatibility procedure 600 may support, for example, isolating a rogue source device, e.g., by detecting a source device transmitting a continuous active source message and controlling one or more switches that cause the source device to be isolated from remaining source devices and the sink device.

Example compatibility procedure 600 may support, for example, modifying a message, e.g., by detecting a source device transmitting a message with an incorrect physical address, modifying the message to include a correct physical address and providing the modified message to a sink device.

V. Example Computer System Implementation

Examples described in FIGS. 1-6 may be implemented in hardware, software and/or firmware (e.g. in a general or special purpose computing device). For example, various functions (e.g. logic, algorithms, databases, operations) described in examples (e.g. FIGS. 1-6) may be implemented as computer program code, which may be stored on a storage device and/or executed by one or more processors. In another example, various functions may be implemented as hardware (e.g. hardware logic/electrical circuitry) alone or combined with software (computer program code configured to be executed in one or more processors or processing devices) and/or firmware.

Figure 7:
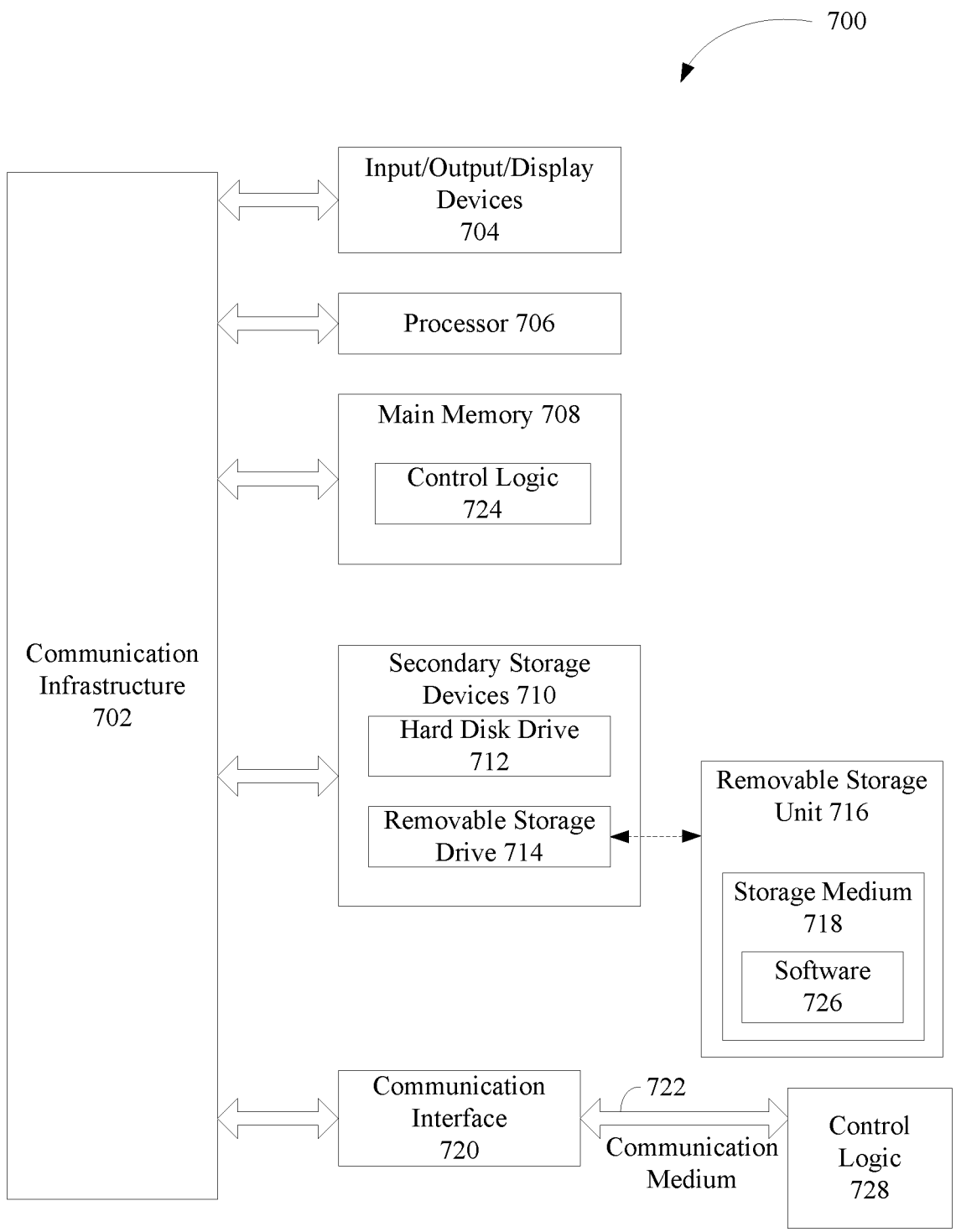
FIG. 7 is an example computer system in which examples herein and/or other examples may be implemented.

FIG. 7 is an example computer system in which examples herein and/or other examples may be implemented. Examples, including systems, methods/processes, and/or apparatuses, may be implemented using a (e.g. well known) computer, such as computer 700 shown in FIG. 7. For example, various functions (e.g. logic, algorithms, databases, operations) described in examples (e.g. FIGS. 1-6) be implemented using one or more computers 700.

Computer 700 may be, for example, any commercially available and well known computer capable of performing the functions described herein, such as computers available from International Business Machines, Apple, Sun, HP, Dell, Cray, etc. Computer 800 may be any type of computer, including a desktop computer, a server, etc.

As shown in FIG. 7, computer 700 includes one or more processors (also called central processing units, or CPUs), such as a processor 706. Processor 706 may be used to implement all or a portion of one or more functions described with respect to examples shown in FIGS. 1-6, although the scope of the embodiments is not limited in this respect. Processor 706 is connected to a communication infrastructure 720, such as a communication bus. In an example, processor 706 may simultaneously operate multiple computing threads.

Computer 700 may include a primary or main memory 708, such as random access memory (RAM). Main memory 708 may store control logic 724 (computer software) and data.

Computer 700 may include one or more secondary storage devices 710. Secondary storage devices 710 may include, for example, a hard disk drive 712, a removable storage device or drive 714 and/or other types of storage devices, such as memory cards and memory sticks. For example, computer 700 may include an industry standard interface, such a universal serial bus (USB) interface for interfacing with devices such as a memory stick or an HDMI interface for interfacing with HDMI devices. Removable storage drive 714 may represent, for example, a floppy disk drive, a magnetic tape drive, a compact disk drive, an optical storage device, tape backup, etc.

Removable storage drive 714 may interact with a removable storage unit 716. Removable storage unit 716 may include a computer useable or readable storage medium 718, which may store computer software 726 (control logic) and/or data. Removable storage unit 716 may represent, for example, a floppy disk, magnetic tape, compact disc (CD), digital versatile disc (DVD), Blu-ray™ disc, optical storage disk, memory stick, memory card or any other computer data storage device. Removable storage drive 714 may read from and/or write to removable storage unit 716.

Computer 700 may include input/output/display devices 704, such as monitors, keyboards, pointing devices, etc.

Computer 700 may include a communication or network interface 720. Communication interface 720 may enable a computer 700 to communicate with remote devices. For example, communication interface 720 may allow computer 700 to communicate over communication networks or mediums 722 (representing a form of a computer useable or readable medium), such as local area networks (LANs), wide area networks (WANs), the Internet, etc. Communication interface 720 may interface with remote sites or networks via wired or wireless connections. Examples of communication interface 722 may include, for example, a modem, a network interface card (e.g. an Ethernet card), a communication port, a Personal Computer Memory Card International Association (PCMCIA) card, etc.

Control logic 728 may be transmitted to and from computer 700 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for implementing one or more functions described in examples herein (e.g. in FIGS. 1-6) and/or further embodiments described herein. Embodiments of the invention are directed to computer program products comprising such logic (e.g., in the form of program code, instructions, or software) stored on any computer useable medium. Such program code, when executed in one or more processors, causes a device to operate according to one or more examples described herein or other examples of subject matter disclosed herein.

Note that such computer-readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

It is noted that while FIG. 7 shows a server/computer, persons skilled in the relevant art(s) would understand that embodiments/features described herein could also be implemented using any other (e.g. well-known) processor-based computing devices, including but not limited to, smart phones, tablet computers, netbooks, gaming consoles, personal media players, and the like.

VI. Conclusion

In accordance with an embodiment, any combination of the above-described embodiments may be utilized, e.g., depending on the system being implemented.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

Embodiments are not limited to the functional blocks, detailed examples, steps, order or the entirety of subject matter presented in the examples. An embodiment of a device, apparatus or machine may comprise any one or more features described herein in any configuration. An embodiment of a method or process may comprise any process described herein, in any order, with any number of steps, using any modality.

Proper interpretation of subject matter claimed in this patent application is limited to patentable subject matter under 35 U.S.C. § 101. As claimed, a procedure (e.g. method) is a process defined by 35 U.S.C. § 101 and each of a circuit, device, apparatus, machine, system, computer, module, media and the like is a machine and/or manufacture defined by 35 U.S.C. § 101.

The appended claims encompass examples and features described herein, modifications and variations thereto as well as additional examples and features that fall within the spirit and scope of the disclosed subject matter.

What is claimed is:

1. A system, comprising:
    a controller comprising first logic and second logic; and
    a switch configured to:
        (a) communicatively couple a plurality of source devices to a sink device when placed in a first state such that communication messages transmitted between the plurality of source devices and the sink device are routed directly therebetween; and
        (b) communicatively couple the plurality of source devices to the controller via a first communication path and communicatively couple the controller to the sink device via a second communication path that is different than the first communication path when placed in a second state such that communication messages transmitted between the plurality of source devices and the sink device are routed indirectly therebetween via the controller,
    the first logic configured to control the switch such that the switch is placed in the second state based on a determination that one of the plurality of source devices is incompatible with another one of the plurality of source devices and such that the switch is placed in the first state based on a determination that each of the plurality of source devices and the sink device is compatible with one another, and
    the second logic configured to modify a communication message from the sink device or a source device among the plurality of source devices when the switch is placed in the second state and in response to the determination that one of the plurality of source devices is incompatible with another one of the plurality of source devices.

2. The system of claim 1, wherein the second logic is configured to modify or block a second communication message from at least one of the plurality of source devices based on a determination that at least a second one of the plurality of source devices is defective or the second communication message therefrom is incompatible with the sink device or the at least one of the plurality of source devices.

3. The system of claim 1, wherein the second logic is configured to modify or block a third communication message based on a determination to overcome a limitation of a communication protocol.

4. The system of claim 1, wherein at least the first logic and the second logic are implemented in a High Definition Multimedia Interface (HDMI) switch.

5. The system of claim 1, wherein at least one of the first communication path or the second communication path comprises a High Definition Multimedia Interface (HDMI) Consumer Electronics Control (CEC) communication path.

6. The system of claim 1, wherein the first logic is further configured to selectively decouple one or more of the plurality of source devices from the sink device.

7. The system of claim 1, wherein the plurality of source devices is separated into a first cluster of source devices and a second cluster of source devices, and wherein the first logic is configured to selectively couple at least one of the first cluster of source devices and the second cluster of source devices to the sink device.

8. A method performed by a compatibility device that is coupled to a switch configured to communicatively couple a plurality of source devices to a sink device when placed in a first state such that communication messages transmitted between the plurality of source devices and the sink device are routed directly therebetween and communicatively couple the plurality of source devices to a controller via a first communication path and communicatively couple the controller to the sink device via a second communication path that is different than the first communication path when placed in a second state such that communication messages transmitted between the plurality of source devices and the sink device are routed indirectly therebetween via the controller, comprising:
    monitoring, by a monitor of the controller, a plurality of source devices communicatively coupled to a sink device;
    determining, by detect logic of the controller, whether at least one of the plurality of source devices is incompatible with another source device of the plurality of source devices; and
    based on a determination that the at least one of the plurality of source devices is incompatible with the other source device, performing at least one of:
        controlling, by the controller, the switch such that the switch is placed in the second state; or
        blocking a message from the at least one of the plurality of source devices; and
    based on a determination that the at least one of the plurality of source devices is compatible with the other source device, controlling, by the controller, the switch such that the switch is placed in the first state.

9. The method of claim 8, wherein blocking the message from the at least one of the plurality of source devices comprises modifying or replacing the blocked message with a proxy message.

10. The method of claim 8, wherein the plurality of source devices is separated into a first cluster of source devices and a second cluster of source devices, and wherein the method further comprises:
    selectively coupling, by the controller, at least one of the first cluster of source devices or the second cluster of source devices to the sink device.

11. The method of claim 8, wherein the compatibility device is implemented in a High Definition Multimedia Interface (HDMI) switch.

12. The method of claim 8, wherein at least one of the first communication path or the second communication path comprises a High Definition Multimedia Interface (HDMI) Consumer Electronics Control (CEC) communication path.

13. The method of claim 8, wherein the method further comprises:
   selectively decoupling, by the controller, one of the plurality of source devices from the sink device.

14. The method of claim 8, further comprising modifying or blocking a second message from the at least one of the plurality of source devices based on a determination to overcome a limitation of a communication protocol.

15. A non-transitory computer-readable storage medium having program instructions recorded thereon that, when executed by at least one processor that is coupled to a switch configured to communicatively couple a plurality of source devices to a sink device when placed in a first state such that communication messages transmitted between the plurality of source devices and the sink device are routed directly therebetween and communicatively couple the plurality of source devices to a controller via a first communication path and communicatively couple the controller to the sink device via a second communication path that is different than the first communication path when placed in a second state such that communication messages transmitted between the plurality of source devices and the sink device are routed indirectly therebetween via the controller, the method comprising:
   monitoring, by a monitor of the controller, a plurality of source devices communicatively coupled to a sink device;
   determining, by detect logic of the controller, whether at least one of the plurality of source devices is incompatible with another source device of the plurality of source devices; and
   based on a determination that the at least one of the plurality of source devices is incompatible with the other source device, performing at least one of:
      controlling, by the controller, the switch such that the switch is placed in the second state; or
      blocking a message from the at least one of the plurality of source devices; and
   based on a determination that the at least one of the plurality of source devices is compatible with the other source device, controlling, by the controller, the switch such that the switch is placed in the first state.

16. The non-transitory computer-readable storage medium of claim 15, the method further comprising:
   blocking the message from the at least one of the plurality of source devices comprises modifying or replacing the blocked message with a proxy message.

17. The non-transitory computer-readable storage medium of claim 15, wherein the plurality of source devices is separated into a first cluster of source devices and a second cluster of source devices, and wherein the method further comprises:
   selectively coupling, by the controller, at least one of the first cluster of source devices or the second cluster of source devices to the sink device.

18. The non-transitory computer-readable storage medium of claim 15, wherein at least one of the first communication path or the second communication path comprises a High Definition Multimedia Interface (HDMI) Consumer Electronics Control (CEC) communication path.

19. The non-transitory computer-readable storage medium of claim 15, wherein the method further comprises:
   selectively decoupling, by the controller, one of the plurality of source devices from the sink device.

20. The non-transitory computer-readable storage medium of claim 15, further comprising modifying or blocking a second message from the at least one of the plurality of source devices based on a determination to overcome a limitation of a communication protocol.

* * * * *